(12) United States Patent
Melkonian et al.

(10) Patent No.: US 10,853,713 B2
(45) Date of Patent: Dec. 1, 2020

(54) IDENTIFICATION COLLAR AND METHODS

(71) Applicant: GLOBAL INTERCONNECT, INC., Pocasset, MA (US)

(72) Inventors: Michael Melkonian, Plymouth, MA (US); Chester Anthony Potter, Rochester, MA (US); Robert Edward Daley, III, Bedford, MA (US); Jonathan W. Goodwin, Braintree, MA (US)

(73) Assignee: GLOBAL INTERCONNECT, INC., Pocasset, MA (US)

( * ) Notice: Subject to any disclaimer, the term of this patent is extended or adjusted under 35 U.S.C. 154(b) by 0 days.

(21) Appl. No.: 16/592,022

(22) Filed: Oct. 3, 2019

(65) Prior Publication Data
US 2020/0110975 A1     Apr. 9, 2020

Related U.S. Application Data

(60) Provisional application No. 62/741,149, filed on Oct. 4, 2018.

(51) Int. Cl.
*G06K 19/06* (2006.01)
*H01B 1/04* (2006.01)

(52) U.S. Cl.
CPC ......... *G06K 19/06056* (2013.01); *H01B 1/04* (2013.01)

(58) Field of Classification Search
CPC ............................ G06K 19/06056; H01B 1/04
USPC .................................................. 235/494, 486
See application file for complete search history.

(56) References Cited

U.S. PATENT DOCUMENTS

| | | | |
|---|---|---|---|
| 2009/0095398 A1* | 4/2009 | Hardin ...................... | B65C 3/02 156/52 |
| 2014/0201260 A1* | 7/2014 | Dor ........................ | G09F 3/0297 709/203 |
| 2019/0229454 A1* | 7/2019 | Contreras .......... | G06K 7/10386 |

* cited by examiner

*Primary Examiner* — Paultep Savusdiphol
(74) *Attorney, Agent, or Firm* — Rothwell, Figg, Ernst & Manbeck, P.C.

(57) ABSTRACT

A collar comprising a top surface having a legend capable of being read by a reading device, a collar body and an inner wall configured to surround and secure the collar to an object placed within a slot defined by the inner wall.

10 Claims, 5 Drawing Sheets

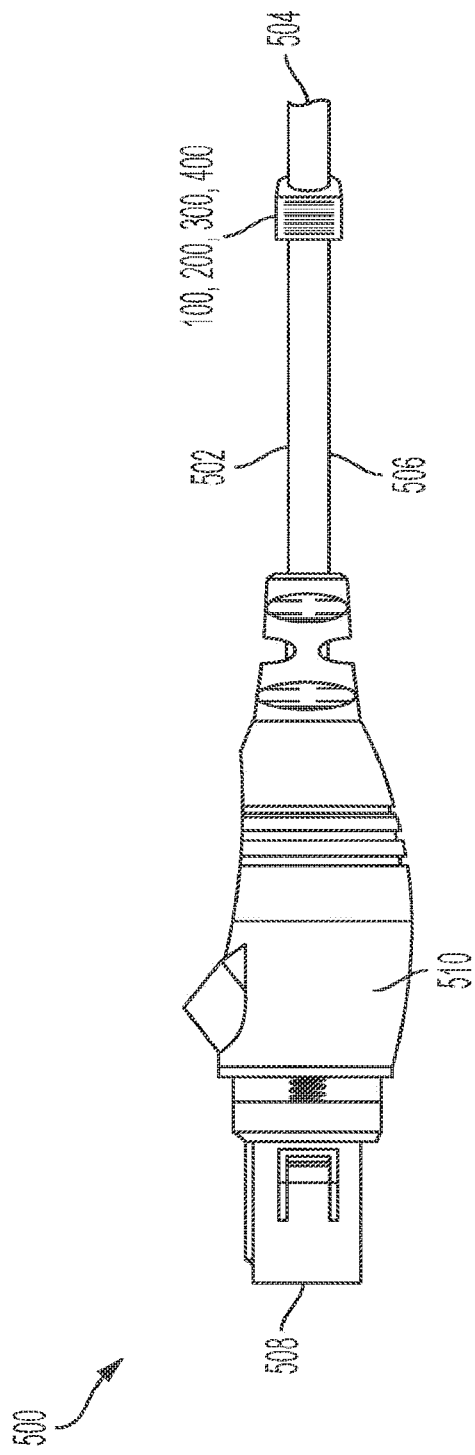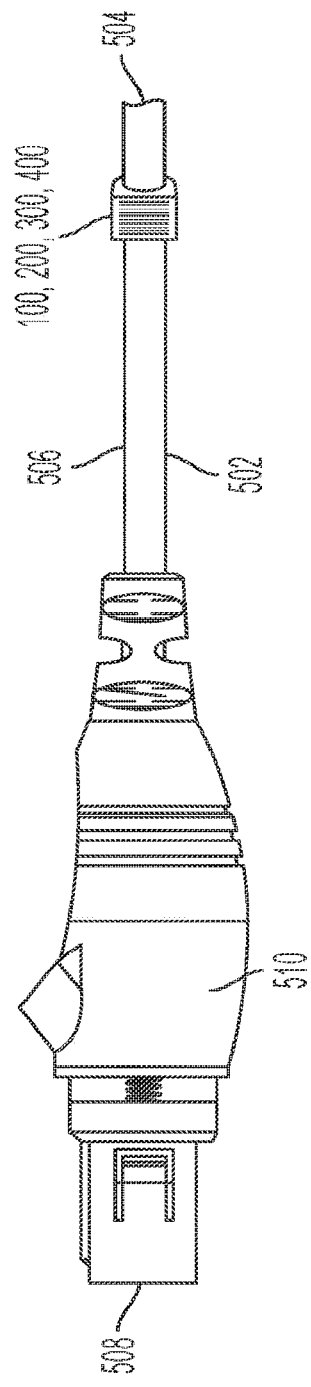

IDENTIFICATION COLLAR AND METHODS

CROSS-REFERENCE TO RELATED APPLICATION

The present invention claims priority to U.S. Provisional Patent Application No. 62/741,149, filed on Oct. 4, 2018, the entire disclosure of which is incorporated herein by reference.

FIELD OF THE INVENTION

The subject matter disclosed herein generally relates to devices and methods for identifying products. Specifically, the disclosure relates to collars that surround medical device cable products so each cable product may be separately identified and tracked through utilization of a barcode identification and/or other identification system and/or method.

BACKGROUND OF THE INVENTION

Tracking key information relating to individual cable products, such as cable-based medical devices, is critical to manufacturers, distributors, and end users for purposes of product identification, inventory management and regulatory compliance in the U.S. and worldwide.

For example, U.S. Food & Drug Administration ("FDA") regulations require, or are expected to require, each reusable medical device product sold or distributed in the United States to be directly marked with a Unique Device Identification ("UDI"). The UDI provides information such as manufacturer, manufacturing location, lot number, date of manufacturing, and other product-related information.

These regulatory standards may change over the course of time, and internal manufacturer, distributor and/or end user protocols may require a host of different additional information depending on internal needs for product identification, inventory management, and other protocols.

Such information is often presented in a manner that can be read by a barcode scanner/reader and/or some other Automatic Identification and Data Capture ("AIDC") technology. Utilization of barcodes on products having flat surfaces can be accomplished with relative ease. However, certain devices, such as cable assemblies having cylindrical, un-level or uneven outer surfaces, make it virtually impossible to laser engrave, pad print, or place a wrap-around barcode label or other readable code onto such surfaces. Furthermore, even if attachment of a barcode is accomplished on such surfaces, the barcode will not be readable because of the curvature of the surface and deformed state of the barcode itself.

Most cable assemblies lack any component part with a flat surface that will accommodate placement of a barcode and barcode reading. Therefore, substantial modifications and tooling changes would need to be made to modify the design of each cable assembly to create a flat surface proper for barcode placement and reading. Such changes cause increased time and cost to modify and manufacture each separate cable assembly.

SUMMARY OF THE INVENTION

There is therefore a need for a device that will incorporate with cable products and assemblies of various shapes and sizes, but that does not require tooling changes, and will supply a flat surface for barcode reading despite the curvature of cable surfaces. Embodiments therefore provide a significant advancement in the field of information management of cable-based products including, but not limited to, cable-based medical devices.

In accordance with one embodiment of the invention, a collar is provided having a top surface with a legend capable of being read by a reading device, a collar body, and an inner wall configured to surround and secure the collar to an object placed within a slot defined by the inner wall.

In another exemplary embodiment, the object is cylindrical, the slot has a diameter in a static position that is smaller than an outer diameter of the object in a static position, and the collar is secured to the object by elastomeric forces applied by the material said collar is comprised of (such as Santoprene of silicone).

In another exemplary embodiment, the legend is a barcode and the reading device is a barcode reader.

In another exemplary embodiment, the collar body has a collar ring portion that is tapered to minimize deformation of the top surface.

In another exemplary embodiment, a method for tracking a product is provided having the steps of providing a product with a collar and legend (e.g., a barcode) affixed to the product capable of being read by a reading device (e.g., a barcode reader), scanning the legend with the reading device; storing data associated with the legend and product in a database; and tracking the product in the database.

The above and other various aspects and embodiments are described below with reference to the accompanying drawings.

BRIEF DESCRIPTION OF THE DRAWINGS

The accompanying drawings, which are incorporated herein and form part of the disclosure, help illustrate various embodiments of the present invention and, together with the description, further serve to describe the invention to enable a person skilled in the pertinent art to make and use the embodiments disclosed herein.

In the drawings, like reference numbers indicate identical or functionally similar elements.

FIGS. 5A-5B illustrate another yet aspect of a collar for identifying a cable as shown and described herein.

DETAILED DESCRIPTION OF THE INVENTION

Figure 1A:
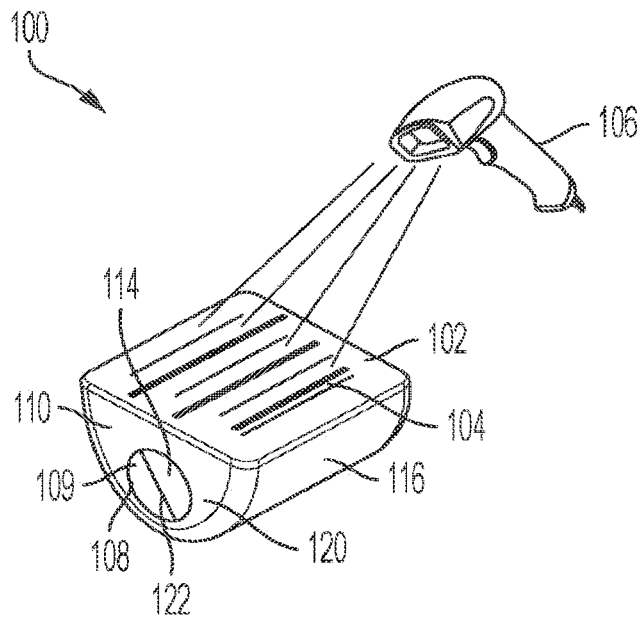
FIGS. 1A-1E illustrate a collar for identifying a cable as shown and described herein.

Referring now to FIGS. 1A-1E, an embodiment of a cable identification collar 100 in accordance with the present invention is shown.

The identification collar 100 has a top surface 102. The top surface 102 is configured to be substantially flat to allow a barcode 104 or other identification legend to be placed on the top surface 102, including, for example through laser engraving. It will be understood that the barcode 104 or other legend can also be applied to the surface 102 through any number of other methods including, but not limited to, a label or sticker with adhesive backing, pad printing, etching, dot matrix and other printing or engraving techniques.

It will be further understood that the top surface 102 does not need to be perfectly flat, but can be of such a shape and dimension such that the barcode 104 or other legend that is placed on the surface 102 can be read by a barcode scanner 106, barcode verifier able to pass regulated acceptance standards (e.g., GS1), Automatic Identification and Data Capture ("AIDC") technology, or other applicable reading/scanning technology.

The identification collar 100 also has a slot 108 through its center 122. In this embodiment, the slot 108 is substantially cylindrical and runs laterally along the collar body 120. The slot 108 has a front opening on the front face 110 of the collar body 120 and a rear opening 124 on the rear face 112 of the collar body 120 as shown in FIG. 1C. The collar 100 also has an inner wall 109 that faces and defines the slot 108.

In one embodiment, the slot 108 is configured to have a slightly smaller diameter 114 than the cable 502 (as shown in FIGS. 5A-B) or the other object it will surround. This diameter 114 will expand as the collar 100 is placed over the cable 302. The expandability of the identification collar 100 will depend on the elastomeric properties of the material the identification collar 100 is comprised of.

It will be understood that the collar 100 may be made of any number of materials that will fulfill the objects of the present invention. For example, in some embodiments, the collar is made of Santoprene™ thermoplastic vulcanizate (TPV), and in other embodiments other elastomeric materials may also be used, including, but not limited to, silicone, thermoset, thermoplastics, and other elastomeric materials and polymers.

When the collar 100 is stretched and placed over the cable 502, the collar 100 will seek to return to its static position. The elastomeric properties of the material will therefore apply a force against the outer surface 506 of the cable 502 causing the collar 100 to secure itself to the outer surface 506 of the cable 502 with the contact being with the inner wall 109. No adhesives or other materials or mechanisms are necessary to secure the collar 100 to the cable 502 in this embodiment. However, in some embodiments, adhesives and other materials or mechanisms can be used to secure the collar 100 to the cable.

In this embodiment, the slot 108 defined by the inner wall is substantially cylindrical, but it will be understood that the cross section of the slot 108 could be rectangular, square, oval, octagonal, and any other geometric shape can be configured to surround and secure to the cable 502 or the other object it will be placed on.

The collar 100 also has side walls 116 and a bottom portion 118 and, in this embodiment, the collar 100 is comprised of solid material throughout its body 120.

Figure 1B:
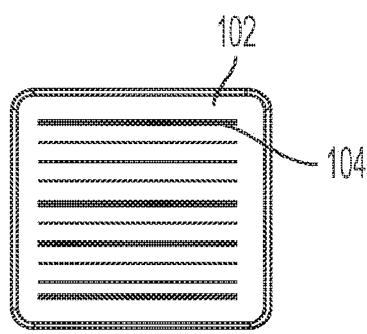
Figure 1C:
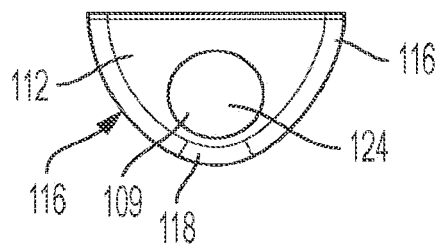
Figure 1D:
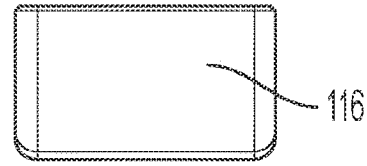
Figure 1E:
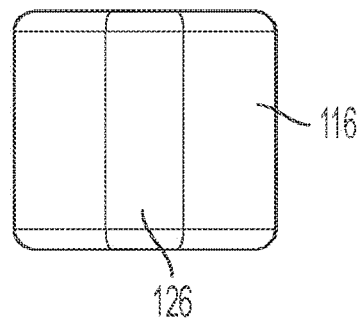

Referring to the remaining aspects of FIGS. 1A-1E, FIG. 1A shows an isometric perspective of the collar 100, FIG. 1B shows a top view of the collar 100, FIG. 1C shows a rear view of the collar 100, FIG. 1D shows a side view of the collar 100 with collar side wall 116, and FIG. 1E shows a bottom view of the collar 100 with collar bottom 126.

It will be understood that the features set forth herein in connection with each of the embodiments can be applied to other embodiments described herein and encompassed by the present invention in general (whether specifically described or not), and vice versa. The description of each of these embodiments are set out as examples and are in no way intended to limit the scope of the invention.

Referring now to FIGS. 2A-2E, another embodiment of an identification collar 200 in accordance with the present invention is shown, which has many of the features set forth in the collar 100 shown in FIGS. 1A-1E, but has a design that includes, inter alia, a larger slot diameter.

In this embodiment, the identification collar 200 has a top surface 202, barcode 204 legend, and slot 208 through its center 222 and along the collar body 220. The slot 208 has a front opening on the front face 210 of the collar body 220 and a rear opening 224 on the rear face 212 of the collar body 220 as shown in FIG. 2C. The collar 200 also has an inner wall 209 that faces and defines the slot 208.

In one embodiment, the slot 208 is configured to have a slightly smaller diameter 214 than the cable 502 (as shown in FIGS. 5A-5B) or the other object it will surround. This diameter 214 will expand as the collar 200 is placed over the cable 502. As in the other embodiments, the expandability of the identification collar 200 will depend on the elastomeric properties of the material the identification collar 200 is comprised of. The collar 200 also has side walls 216 and a bottom portion 218 and the collar 200 is comprised of solid material throughout its body 220.

Figure 2A:
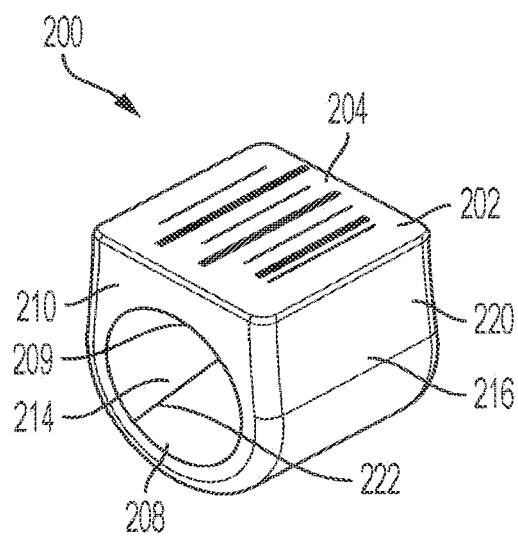
FIGS. 2A-2E illustrate another aspect of a collar for identifying a cable as shown and described herein.
Figure 2B:
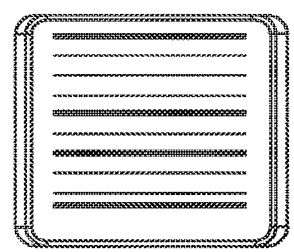
Figure 2C:
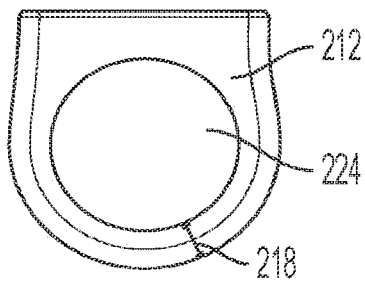
Figure 2D:
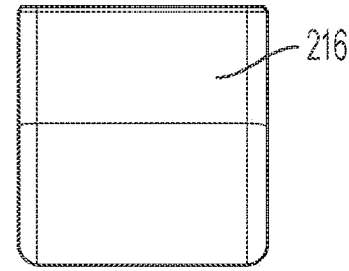
Figure 2E:
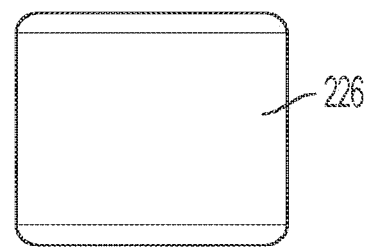

Referring to the remaining aspects of FIGS. 2A-2E, FIG. 2A shows an isometric perspective of the collar 200, FIG. 2B shows a top view of the collar 200, FIG. 2C shows a rear view of the collar 200, FIG. 2D shows a side view of the collar 200 with collar side wall 216, and FIG. 2E shows a bottom view of the collar 200 with collar bottom 226.

Figure 3:
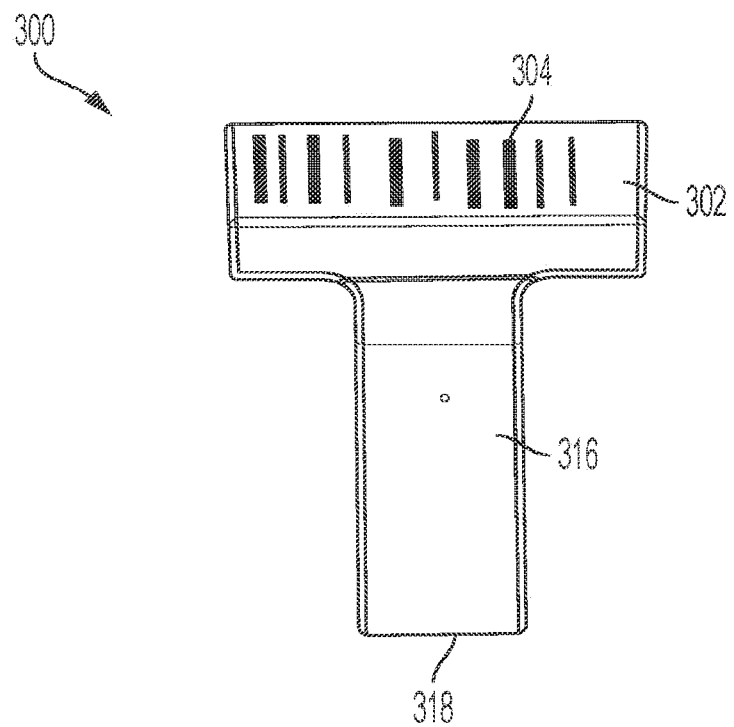
FIG. 3 illustrates another yet aspect of a collar for identifying a cable as shown and described herein.
Figure 3:
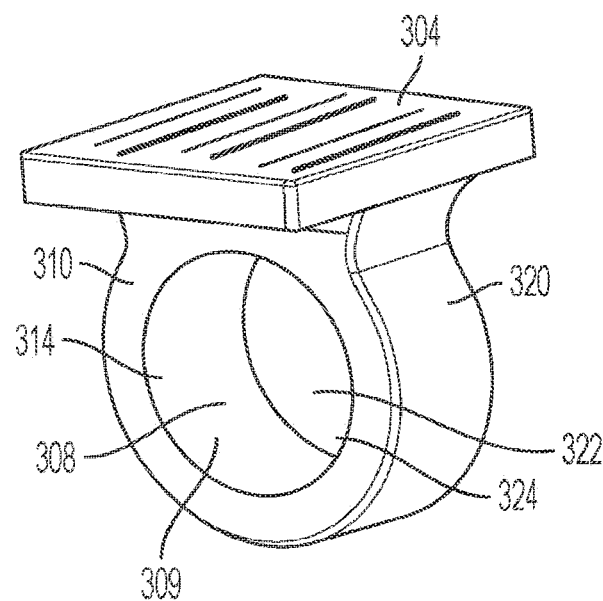

Referring now to FIG. 3, another embodiment of an identification collar 300 in accordance with the present invention is shown, which has many of the features set forth in the collar 100 shown in FIGS. 1A-1E and 2A-2E, but has a design that includes, inter alia, a larger slot diameter and a "T"-shaped side profile.

In this embodiment, the identification collar 300 has a top surface 302, barcode legend 304, and slot 308 through its center 322 and along the collar body 320. The slot 308 has a front opening on the front face 310 of the collar body 320 and a rear opening 324 on the rear face of the collar body 320. The collar 300 also has an inner wall 309 that faces and defines the slot 308.

In one embodiment, the slot 308 is configured to have a slightly smaller diameter 314 than the cable 502 (as shown in FIGS. 5A-5B) or the other object it will surround. This diameter 314 will expand as the collar 300 is placed over the cable 502. As in the other embodiments, the expandability of the identification collar 300 will depend on the elastomeric properties of the material the identification collar 300 is comprised of. The collar 300 also has side walls 316 and a bottom portion 318 and the collar 300 is comprised of solid material throughout its body 320.

Figure 4:
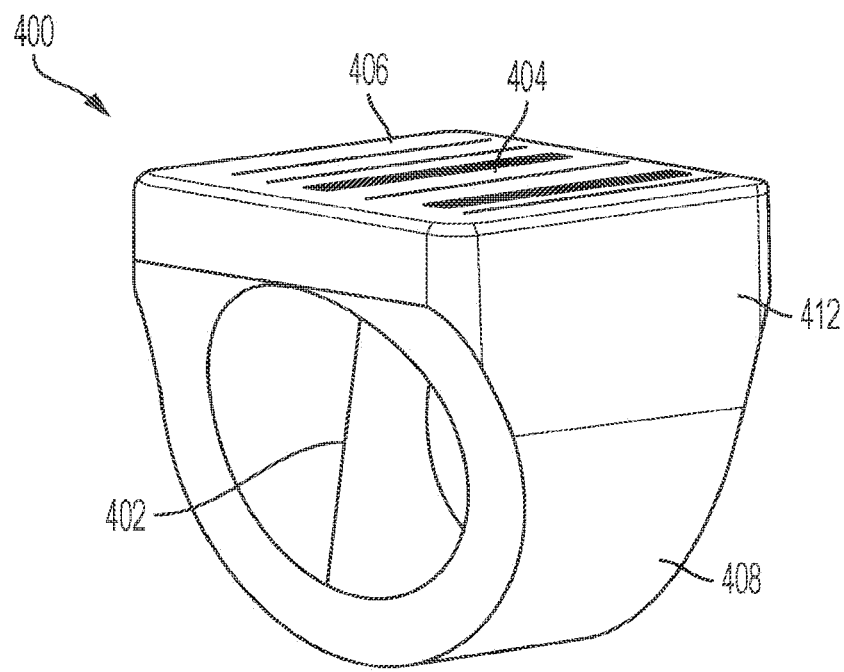
FIG. 4 illustrates another yet aspect of a collar for identifying a cable as shown and described herein.
Figure 4:
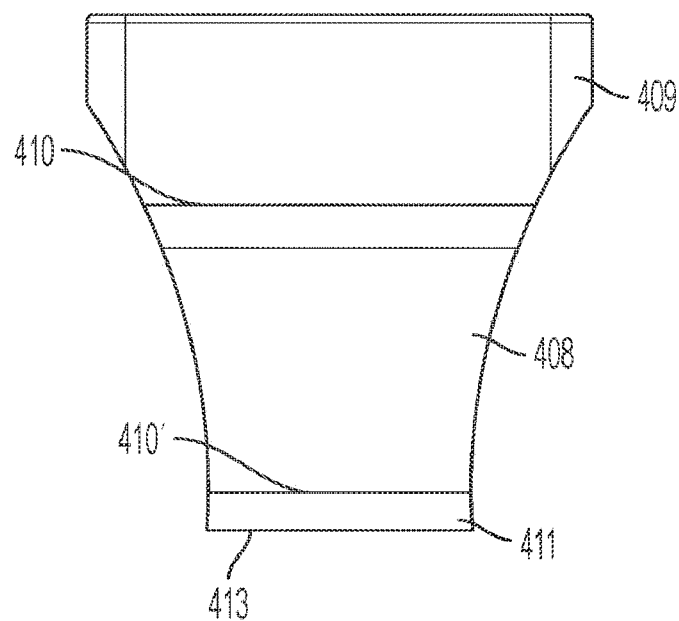

Referring now to FIG. 4, another embodiment of the present invention is provided. In this embodiment, the collar 400 has a ring portion 408 that has a width 410 that when viewed via its side profile, tapers from the section proximate to the top surface 404 to the section distal to the top surface 404 and proximate to bottom 413 of the collar body 412 (e.g., the difference in width from 410 (broader width) to 410' (narrower width)).

As a general matter, when collars in certain configurations are substantially stretched, for example, when stretching over a cable having a diameter relatively larger than the diameter of the slot, the elastomeric stretching can tend to affect the flatness of the top surface 404 and consequently the barcode image 406 on the surface 404, potentially causing poor code reading or even prohibiting the reading altogether. Such distortion of the top surface 404 upon overall collar stretching, with the top surface 404 intended to remain substantially flat, will depend on the materials used and overall configuration of the collar body.

In this embodiment, tapering the width 410 of the collar ring portion 408 of the collar 400, (e.g., making the ring width 410' narrower), when the collar is stretched over an object (e.g., a cable), the major deformation is configured to occur mainly in the ring portion 408, preventing the top surface 404 from deforming to a point where barcode reading is difficult or impossible.

It will be understood that features and properties set forth in FIGS. 1A-1E, 2A-2E, and 3 may be incorporated into the embodiment show in FIG. 4, and vice versa, with all components utilized as appropriate for a given application. Similarly, any number of the features and properties of one or more of the embodiments disclosed herein can be incorporated to form different embodiments, in any number of conceivable combinations, with any number of conceivable alterations, depending on a given application.

Referring now to FIGS. 5A-5B, a cable assembly is shown utilizing the cable identification collars 100, 200, 300, 400 (or any other configuration under the present invention). A typical cable assembly has components including a connector 508, over-mold 510, and cable 502. It will be understood that the cable could be any other shape, size or type, not limited to the cable example shown in FIGS. 5A-5B.

It will be further understood that the identification collars of the present invention are configured to be stretched to surround the cable 502, and secured into place once the force stretching the collars is released.

It will be understood that, for collars made of elastomeric materials, the stretching of each collar can be performed by a sleeve expander or other tool configured to expand the inner diameter of the collar such that the collar can be placed over the outer diameter of the cable 502. The tool can be a hand tool or automated tool, depending on the manufacturing and throughput needs.

It will be understood that many other collar configurations and securing mechanisms are also encompassed within the present invention including, but not limited to, a slide-on injected molded ring that is sized for a specific cable and is bonded or over-molded on the specific cable; collars that are secured through press fit, crimp, interference fit, snap collar, hinged (i.e., hinged collar); and/or other methods and/or configurations.

It will be further understood that the types of materials used to comprise the collar and other collar embodiments are not limited to elastomeric materials. Other embodiments could include collars made of non-elastic, rigid materials fixed to the cable 502 through adhesives or other materials or mechanisms are necessary to secure the collar to the cable 502.

In another aspect of the present invention, a method for tracking a product is provided. In this embodiment, the method includes providing a product having a collar (or any other configuration under the present invention) and legend affixed to a surface on the collar, where the legend is capable of being read by a reading device.

The method further includes scanning the legend with a barcode scanner, storing the information provided by or otherwise contained in the barcode in a database ("Product Information"), and tracking (e.g., keeping track of and/or monitoring) the cable within the database based on such information.

It will be understood that the product can be any product, including a cable-based medical device. It will be further understood that the legend can be a barcode and the reading device can be a barcode scanner. It will be further understood that the legend can be affixed to a substantially flat surface of the collar. It will be understood that the collar/cable configuration can be any configuration as described herein or otherwise encompassed by the present invention.

It will be further understood that Product Information utilized in accordance with the present invention can include, but is not limited to, information relating to manufacturing location, lot number, date of manufacturing, expiration date, serial number, model number, device number, manufacturer and/or owner, and any and all other product-related information applicable to a given application.

It will be further understood that the database could be an internal database owned and/or operated by or on behalf of a given person or entity, a global or central database shared by multiple parties, a database administered by a regulatory authority in the U.S. or a foreign country, and/or any other database utilized for a given application.

It will be further understood that parties utilizing the present invention, including storing information in a database, may include, but are not limited to, manufacturers, importers, re-sellers, distributors, institutions, professionals, individuals, corporations, and/or any other persons or entities utilizing the products or methods of the present invention.

It will be understood, overall, that the embodiments of the invention described above are intended to be merely exemplary; numerous variations and modifications will be apparent to those skilled in the art. All such variations and modifications are intended to be within the scope of the present invention as defined in any appended claims.

The invention claimed is:

1. A cable identifying collar, the collar comprising:
   a top surface comprising a legend, wherein the legend is capable of being read by a reading device and includes identifying information;
   a collar body extending from the top surface; and
   an inner wall having a slot capable of receiving an object, the inner wall being located on an interior of the collar body,
   wherein the inner wall is configured to surround and secure the collar to the object within the slot,
   wherein the object comprises a cable having a cylindrical, un-level, or uneven outer surface, and
   wherein the slot capable of receiving the object further includes the object and the inner wall surrounds and secures the collar to the object within the slot, and wherein the slot has a diameter in a static position that is smaller than an outer diameter of the cable in a static position, such that the collar is secured to the cable by elastomeric forces applied by material the collar is comprised of.

2. The collar of claim 1, wherein the material is Santoprene.

3. The collar of claim 1, wherein the material is silicone.

4. The collar of claim 1, wherein the legend is a barcode.

5. The collar of claim 1, wherein the reading device is a barcode reader.

6. The collar of claim 1, wherein the collar body comprises a collar ring portion that is tapered.

7. A method of tracking, the method comprising:
   providing an object having a collar and legend affixed to the collar that is capable of being read by a reading device;
   scanning the legend with the reading device;
   storing data associated with the legend in a database; and
   tracking the object based on the data in the database,
   wherein the object comprises a cable having a cylindrical, un-level, or uneven outer surface, and wherein the collar is secured to the cable by elastomeric forces applied by material the collar is comprised of.

8. The method of claim 7, wherein the legend is a barcode.

9. The method of claim 7, wherein the reading device is a barcode reader.

10. The method of claim 7, wherein the collar is a collar according to claim 1.

* * * * *